June 4, 1929.  O. BEHIMER  1,716,162
DEVICE FOR COOLING PACKING
Filed April 9, 1921   2 Sheets-Sheet 1
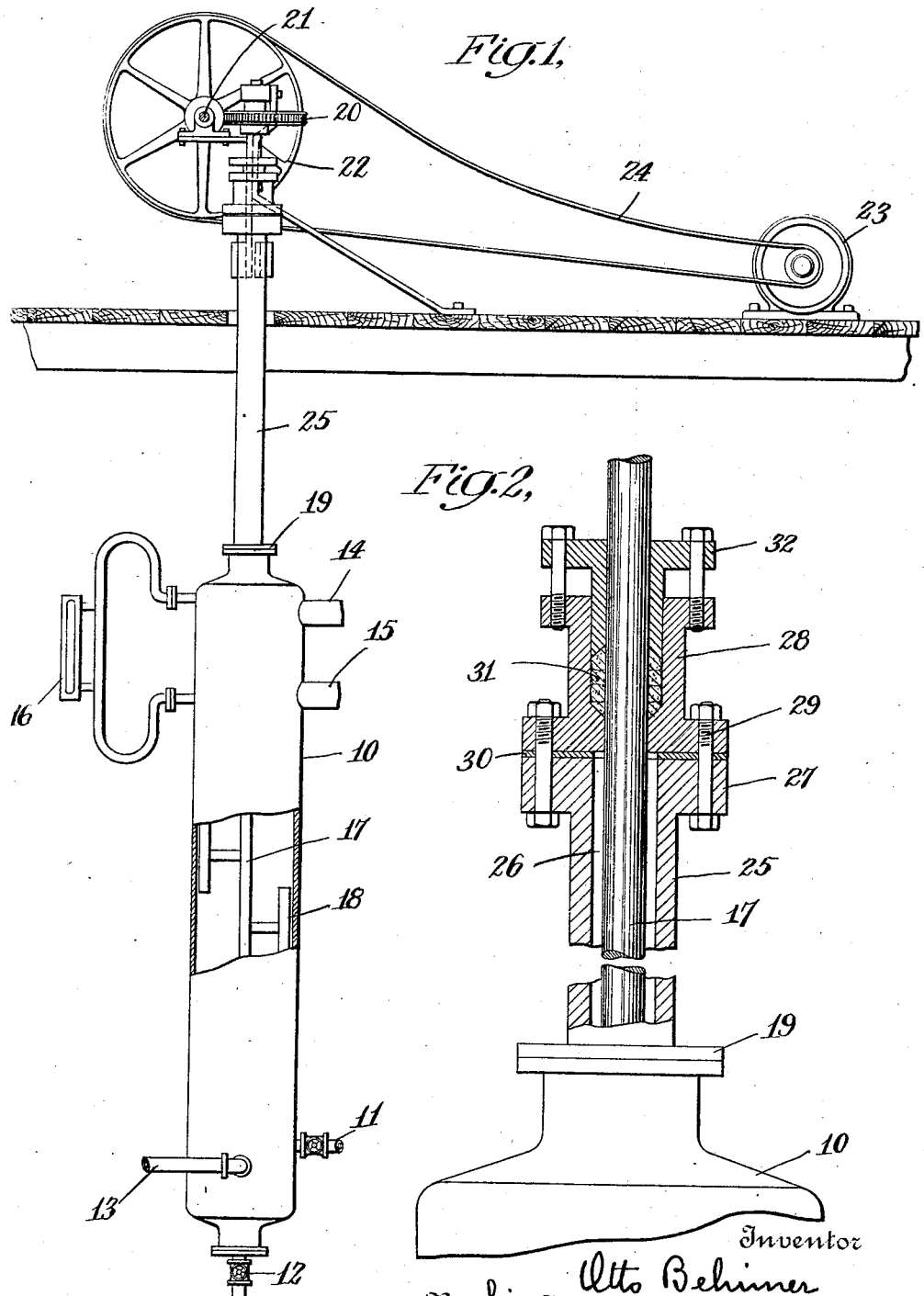
Inventor
Otto Behimer
By his Attorney June 4, 1929.                O. BEHIMER                1,716,162
                      DEVICE FOR COOLING PACKING
                        Filed April 9, 1921        2 Sheets-Sheet 2
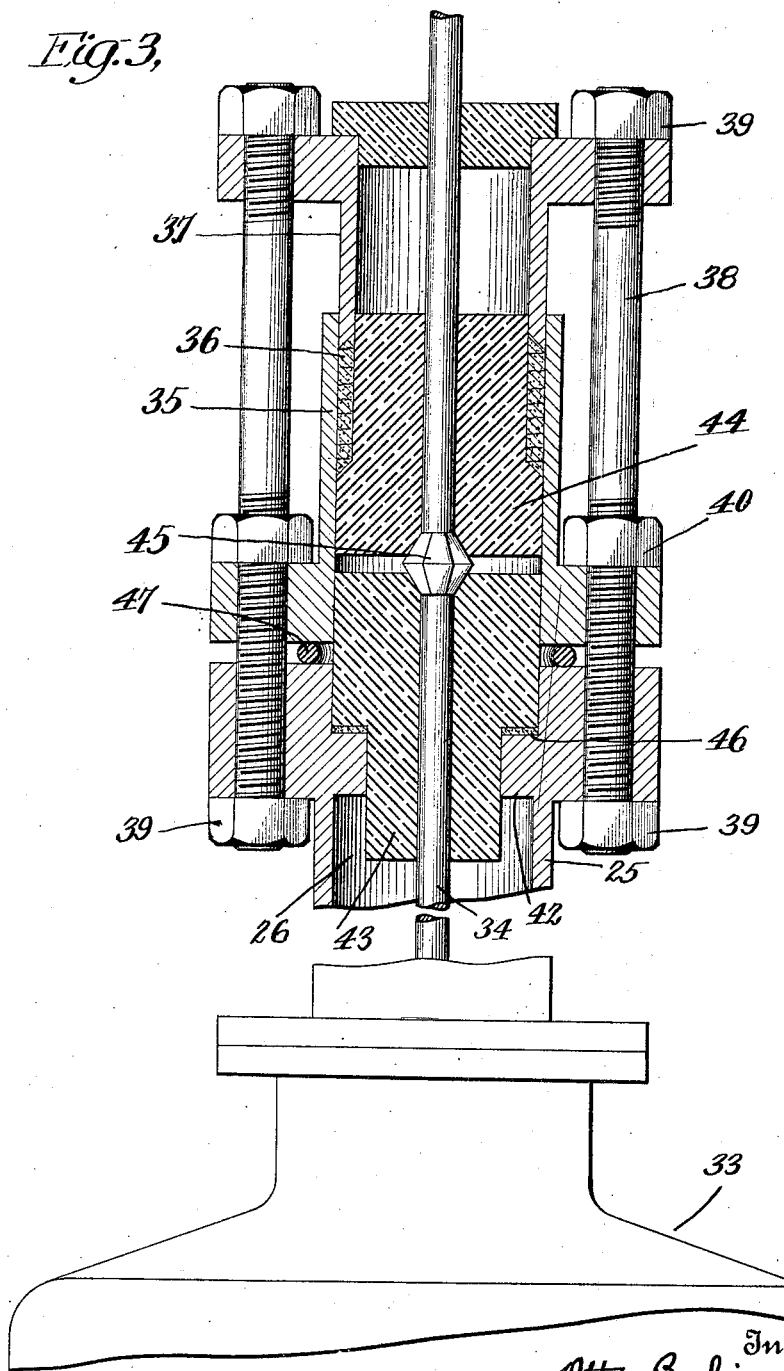
Fig.3,
Inventor
Otto Behimer
By his Attorney Patented June 4, 1929.

1,716,162

UNITED STATES PATENT OFFICE.

OTTO BEHIMER, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

DEVICE FOR COOLING PACKING.

Application filed April 9, 1921. Serial No. 460,112.

This invention relates to means for protecting joints, insulation and the like from the action of heat and has special reference to the cooling of packing for shafts, piston rods and other movable parts of machinery, as well as the cooling of fixed joints and the protection of insulation, employed in stills, retorts or other containers, so that the packing or insulation is prevented from deterioration by the heat and is enabled to serve its function.

The proper packing of shafts and piston rods used in various industries for stirring and agitating materials undergoing chemical or other treatment, particularly under high temperatures and pressures, has hitherto been attended with great difficulty due to the fact that packing materials are unable to withstand the heat under the pressures used. For example, in the distillation of hydrocarbon oils under high temperatures and pressures wherein shafts are frequently employed for operating scrapers for removing carbon from the walls of stills, it has been found practically impossible to prevent the packing joints of the shafts from leaking, with the result that not only have destructive explosions and fires frequently occured but the operation of such processes has been impeded, and their scope greatly limited.

It has also been a problem to properly insulate electrical conductors used in many chemical and metallurgical industries. Insulators are more or less of a fragile nature and deteriorate rapidly under high temperatures; the heating of the insulating materials also depreciates their insulating property. Thus in attempting to employ electrically heated stills for the destructive distillation of hydrocarbon oils the lack of any means for protecting the insulation from the heat has operated as a limitation upon such a method of operation.

My invention contemplates the utilization of a gas pocket for so reducing the temperature around the packing joint or insulation that the packing or insulation may be kept sufficiently cool to properly function. In other words a permanent gas, or a vapor uncondensable under the conditions in which it is used, is interposed between the heated materials being treated and the stuffing box or insulation. I take advantage of the fact that gas is a poor conductor of heat and therefore provide a protecting zone of gas so proportioned that the loss of heat through radiation will offset any heat conduction along the container walls or through the gas itself. The invention further contemplates the interposition of an inert mass of gas, preferably in the form of a column, intervening between the heat and the packing joint, the gas being of such nature under the conditions imposed upon it that the distillation or the formation of convection currents is avoided.

In order to fully disclose my invention I have illustrated in the accompanying drawings particular applications thereof in which the invention is utilized in connection with the decomposition of higher boiling hydrocarbons into lower boiling ones by means of heat and pressure.

In the drawings:

Figure 1 is a view in side elevation, partially in section, of an apparatus constructed in accordance with the invention and constituting a preferred embodiment thereof.

Figure 2 is an enlarged vertical section partly in elevation.

Figure 3 is a vertical section partly in elevation illustrating an embodiment of the invention used for protecting electric insulation.

The particular form of the invention illustrated in Figures 1 and 2 embodies means for protecting a stuffing box. As shown a vertical still 10 is provided. The still is equipped with various pipes for charging or drawing off oil such as the pipes 11, 12 and 13. It is also provided with a vapor line 14 which extends to suitable air condensers, water cool condensers, receivers and the like, as will be readily understood by those skilled in the art. In case the still 10 be one of a series of stills instead of having the vapor line 14 extending to a condenser each still may have a vapor equalizing line 14 for connecting the several stills in series and also a liquid level line 15. The still may be provided with a liquid level gauge 16 and such other accessories as may be necessary.

In the form of apparatus illustrated the still is provided with a rotatable shaft 17 carrying scrapers 18 designed for removing carbon and coke from the walls of the still. The shaft 17 protrudes a certain distance above the still head 19. The shaft is operated by any suitable mechanism; for example, it may be provided with a gear 20 meshing with a worm on shaft 21 which is operated by pulley 22 driven by motor 23 by means of a belt 24. It is to be understood that instead of having a rotatable shaft a piston rod may be substituted for the shaft 17, the piston rod being operated by any suitable mechanism.

A pipe 25 having an internal diameter greater than the diameter of the shaft is attached to the top of the still head 19 and encloses the shaft 17 so as to form a space 26 about the shaft. The upper end of the pipe 25 includes a flange 27 by which the pipe may be attached to a stuffing box 28, as by means of bolts 29, a packing 30 being inserted between the flanges of the stuffing box and the pipe. The stuffing box is provided with packing 31 and a gland 32.

The length of the pipe or chamber 25 is so proportioned that the loss of heat through radiation will offset the heat conduction from the still through the metal to the stuffing box 28. As an example of the length of the pipe 25 it may be stated that with a temperature of approximately 800° F. in the still a pipe of from about 2 to 5 feet in length has been found satisfactory in reducing the temperature sufficiently to protect the stuffing box of the shaft. The diameter of the pipe 25 is preferably not relatively large as compared with the shaft so that the columnar space 26 may be comparatively narrow, thus reducing to a minimum the possibility of the formation of convection currents in the space 26 and providing a maximum effective radiating surface. It is to be noted that the space in the still above the vapor line 14 constitutes a portion of the gas pocket.

In the decomposition of hydrocarbon oils by means of heat and pressure some permanent gas is formed as well as vapors which, under the temperatures and pressures obtaining in the still or its adjacent parts, are not condensable. As the distillation proceeds these gases accumulate in the space 26 and in the space in the still above the vapor line 14. The same result is obtainable whether an autogenous pressure is relied on, or an extraneous gas is introduced into the still, to build up the required pressure. The gas accumulates or pockets in the still above the vapor line and in the space 26 and being non-condensable under the conditions obtaining therein there will be no condensing or distilling action and an inert mass of gas is formed devoid of convection currents by which heat might be conveyed to the stuffing box 28. It is thus possible to have extremely high temperatures in the still, such for example as the commonly employed cracking temperatures of 700 to 900 degrees, and by means of the non-conducting pocket 26 the stuffing box may be easily held at 200 or 300 degrees or even at practically atmospheric temperature. Since at these temperatures no difficulty is experienced with the packing withstanding the pressures employed the shaft 17 may thus be securely packed and the process allowed to continue uninterruptedly.

In Figure 3 I have illustrated a convenient method of protecting the insulation of an electrical conductor entering the still 33. Attached to the top of the still is a vertically extending pipe 25 through which the conductor 34 passes, there being a space 26 between the conductor and pipe 25. Mounted at the upper termination of the pipe is a stuffing box 35 provided with packing 36 and gland 37. The pipe, gland and stuffing box have flanged portions so that they may be bolted together by means of bolts 38 secured by tightening nuts 39 and lock nuts 40. A packing ring 47 is placed in the joint between the pipe 25 and stuffing box 35. The pipe 25 is provided with an inwardly extending flange or shoulder 42 for retaining the insulating material 43. Another insulating member 44 is placed beneath the gland 37 and rests against an enlarged portion 45, preferably hexagonal in form, of the conductor 34. When the gland is bolted into position the insulation 43 is forced against the shoulder 42 which may be provided with a packing material 46, if desired. By means of the gas space separating the insulation from the heat in the still the insulation is maintained at a relatively cool condition and thus no difficulty is experienced in properly insulating the conductor.

My invention is capable of a wide application in a great many fields of industry. It has particular advantage in the distillatory processes wherein piston rods, shafts, valve stems and other movable parts operating either with rotating or reciprocating movements, are used in closed containers. The practice of my invention is also applicable in protecting the packing of stationary joints, electrical insulation, and the like from the action of heat. Apparatus of preferred form and construction has been illustrated for the purpose of showing particular ways in which the invention may be used, but the inventive thought upon which this application is based, is broader than the illustrative embodiment thereof, and I therefore intend no limitations other than those imposed by the appended claims.

What I claim is:—

1. In apparatus for vaporizing liquids, the combination with a container adapted and arranged for vaporizing liquid and a stuffing box accessory thereto, of a columnar chamber extending upwardly from the vapor space of said container and in open communication therewith and formed to provide a gas pocket adapted to retard the transfer of heat from the container to the stuffing box.

2. The combination with a still and a stuffing box accessory thereto, of a chamber extending upwardly from the vapor space of said still and in open communication therewith and formed to provide a gas pocket between the still and said stuffing box so as to retard the transfer of heat from the still to the stuffing box.

3. The combination with a still and a stuffing box accessory thereto, of a chamber in open communication with the vapor portion of the still and extending upwardly therefrom, said chamber being formed to provide a gas pocket between the still and said stuffing box and so proportioned that heat conduction through said chamber from the still to said stuffing box is offset by loss of heat by radiation.

4. The combination of a still, a shaft mounted in said still and extending upwardly outside of said still, a tubular member in open communication with the still disposed about said shaft and extending upwardly above the vapor outlet of the still so as to provide a gas pocket about said shaft; and a stuffing box for said shaft mounted on the upper end of said tubular member, the said gas pocket being adapted to retard the transfer of heat from the still to the stuffing box.

5. The combination with a still maintained under heat and pressure, of a shaft extending upwardly from the top of the still, a packing member enclosing a portion of the shaft, and means in open and direct communication with the still disposed between the still and the packing member for collecting and retaining permanent gases from the still for preventing the conduction of heat from the still to the packing member.

6. The combination with a still and a stuffing box accessory thereto, of a chamber in open communication with the vapor space of the still and extending upwardly therefrom above the vapor outlet thereof and at the upper end of which chamber said stuffing box is mounted, the said chamber being adapted to retard the transfer of heat from the still to the stuffing box.

7. In combination with a container for treating hydrocarbon oil under heat and pressure, a rod-like member extending into the container through the top thereof, a stuffing box disposed on said rod at a point distant from the container, and means disposed between the container and the stuffing box and in open communication with the container adapted to form a gas pocket for collecting the permanent gases formed in the container, the said gas pocket being adapted to retard the transfer of heat from the container to the stuffing box.

8. In combination with a container for treating hydrocarbon oil under heat and pressure, a rod-like member extending into the container through the top thereof, a stuffing box disposed on said rod at a point distant from the container, and an elongated chambered member disposed around the rod-like member between the container and the stuffing box and in open communication with the container wherein the permanent gases formed in the container may collect while the heat thereof is given off by radiation through the walls of the chambered member.

In witness whereof I have hereunto set my hand this 2d day of April, 1921.

OTTO BEHIMER.